J. R. BARRETT.
TEMPORARY BINDER.

No. 184,747.  Patented Nov. 28, 1876.

WITNESSES:
Julius Wilcke
N. H. Sherburne

INVENTOR:
John R. Barrett
By Gridley & Sherburne
Attys

UNITED STATES PATENT OFFICE.

JOHN R. BARRETT, OF CHICAGO, ILLINOIS.

IMPROVEMENT IN TEMPORARY BINDERS.

Specification forming part of Letters Patent No. 184,747, dated November 28, 1876; application filed April 24, 1876.

*To all whom it may concern:*

Be it known that I, JOHN R. BARRETT, of Chicago, in the county of Cook and State of Illinois, have invented certain new and useful Improvements in Temporary Binders; and I do hereby declare the following to be a full, clear, and exact description thereof, which will enable others skilled in the art to which it appertains to make and use the same, reference being had to the accompanying drawing, forming part of this specification, in which—

Figure 1:
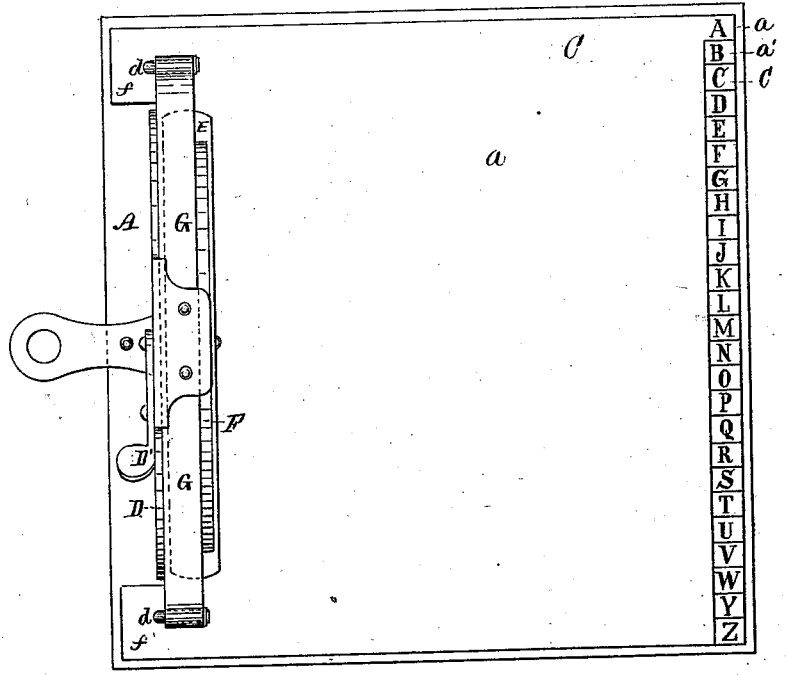
Figure 2:
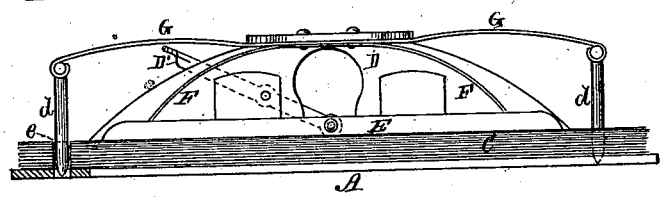
Figure 3:
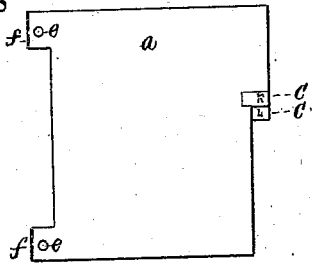

Figure 1 represents a general plan or top view of a paper-file embodying my invention. Fig. 2 represents a front elevation of the same; and Fig. 3 represents a diminished plan view of one of the index-sheets detached.

Like letters of reference indicate like parts.

My invention relates to that class of paper-files in which the letters or papers are placed between a series of index-sheets in alphabetical order, and secured in place by pressure-springs; and my invention consists in the arrangement of the index-sheets, and the means employed to hold them in place, as is hereinafter more fully described.

In the drawing, A represents the base, which may be made of any suitable material, and of the proper size to support the index-sheets, and letters or papers resting thereon. C C represent the index-sheets, made of paper, and of any suitable size; and each of said index-sheets is made of a single sheet of paper folded at its center, so as to form two parts, $a$ and $a'$, and twelve or more of said index-sheets are arranged, one above the other, upon the base A, in such a manner as to admit of placing between said sheets the letters or papers as desired to be filed.

D is the clip-frame, which is permanently attached to the base A, near one of its edges, as shown in Fig. 1. D' is a thumb-piece or lever, which is fulcrumed at its center to the frame D, and is attached at its lower end to the clamp-bar E, which is adjusted to bear upon the index-sheets. F is a curved pressure-spring attached at its center to the frame D, and so arranged that its ends are made to bear upon the clamping-bar E, near its ends, as shown in Fig. 2. The arrangement of said spring is such as to hold the bar upon the index-sheets with sufficient pressure to retain them in place, and to yield and allow the bar to be raised when force is applied to the lever, by which means the letters or papers desired to be filed can be readily introduced between the index-sheets and under the bar. G is a pressure-spring secured at its center to the frame D, and extending outward at each end, laterally, to a point near the edge of the index-sheets, as shown in Figs. 1 and 2. This spring is provided at each end with a depending pivot, $d$, hinged thereto, and so arranged as to pass through the perforations $e$ formed through the parts $a$ $a'$ of the respective index-sheets, to and into a like perforation in the base A, as shown in Fig. 2, whereby the series of index-sheets are secured in place when the bar E is elevated for the purpose of introducing the papers to be filed between the respective index-sheets. Each of the index-sheets is notched or cut away at the center of its folded edge, forming the projections $f$ $f$, which extend past the clip-frame, as shown in Fig. 1, thereby allowing the pivots $d$ to pass through each sheet at a point in a plane with the back of the frame, whereby the letters or papers, being filed within said index-sheets, can pass under the clamping-bar E of the clip without coming in contact with the pivots.

In using my said improved paper-file, the letters or papers which are desired to be filed are arranged between the index-sheets and under the clamp-bar in the usual manner.

I am aware that paper-files employing spring-pressure, a clamp-bar, and unfolded disconnected index-sheets, have heretofore been used, and I do not claim such broadly.

Having thus described my invention, what I claim as new, and desire to secure by Letters Patent, is—

1. The combination, with a paper clip or file, of the pressure-spring G, provided with depending pivots $d$, adapted to pass through perforations in the index-sheets, substantially as and for the purpose specified.

2. The combination, with the spring G, provided with the depending pivots $d$, of a series or set of folded, disconnected indexed sheets, perforated to receive the said pivots $d$ of the spring G, substantially as and for the purpose specified.

JOHN R. BARRETT.

Witnesses:
N. C. GRIDLEY,
N. H. SHERBURNE.